United States Patent [19]

Suganuma et al.

[11] Patent Number: 5,024,902

[45] Date of Patent: Jun. 18, 1991

[54] FIBER-REINFORCED METAL

[75] Inventors: Katsuaki Suganuma, Yokosuka; Hiroyuki Fujii, Uji; Hiroyoshi Minakuchi, Kyoto; Katsuhiko Kada, Souraku; Haruo Osafune, Kameoka; Kuniaki Kanamaru, Kyoto, all of Japan

[73] Assignee: Shimadzu Corporation, Kyoto, Japan

[21] Appl. No.: 538,436

[22] Filed: Jun. 15, 1990

[30] Foreign Application Priority Data

Jun. 27, 1989 [JP] Japan .................................. 1-165554

[51] Int. Cl.⁵ ............................................ C03C 13/00
[52] U.S. Cl. .................................... 428/633; 428/361; 428/378; 428/388; 428/389; 428/396

[58] Field of Search ............... 428/361, 378, 388, 389, 428/396, 633

[56] References Cited

U.S. PATENT DOCUMENTS 4,515,866  5/1985  Okamoto et al. ................... 428/614
4,961,990 10/1990  Yamada et al. ..................... 428/240
4,970,123 11/1990  Witzke et al. ....................... 428/545

Primary Examiner—Brooks H. Hunt
Assistant Examiner—Leon Nigohosian, Jr.
Attorney, Agent, or Firm—Armstrong, Nikaido, Marmelstein, Kubovcik & Murray

[57] ABSTRACT

A fiber-reinforced metal comprising glass fibers and a matrix metal, said glass fibers having a nitrogen content of at least 8 atomic %. The fiber-reinforced metal has a high tensile strength and elasticity.

5 Claims, 2 Drawing Sheets

FIBER-REINFORCED METAL

FIELD OF THE INVENTION

The present invention relates to glass-reinforced metal.

BACKGROUND OF THE INVENTION

In fiber-reinforced metal (hereinafter referred to briefly as FRM), physical characteristics not found in the metal itself have been realized by the combination of the metal with a fiber. Representative species of the hitherto-known FRM include aluminum alloys reinforced with carbon fiber, ceramic fibers [SiC fiber, Si-Ti-C-O fiber (tilano fiber), alumina fiber, boron fiber, etc.] or glass fiber, in which high tensile strength and rigidity and low coefficients of thermal expansion have been imparted to matrix metals.

However, in the conventional FRM, where the reinforcing fiber is carbon fiber, for instance, a reaction takes place between molten aluminum and reinforcing fiber to form aluminum carbide $Al_4C_3$ so that the strength of FRM is not much increased. SiC or Si-Ti-C-O (tilano fiber), which is a ceramic fiber, cannot give a FRM with sufficient strength because of poor wetting by aluminum. Moreover, fiber containing $SiO_2$, which is among alumina fibers, reacts with molten aluminum, while $SiO_2$-free alumina fiber is not reactive and good in wetting property but is low in strength (141 kg/mm$^2$). Moreover, boron fiber is so large in fiber diameter that it does not lend itself well to complicated product configurations so that it connot function well as a reinforcing fiber for FRM. These ceramic fibers have the additional serious disadvantage of high costs. Kevlar, which is a high-strength organic fiber, is low in heat resistance, and glass fibers in general are reactive with molten alloys and low in elasticity and strength.

Thus, the conventional FRM, thus made up of reinforcing fiber and matrix metal, are disadvantageous for example in that the reinforcing fiber and matrix metal react at their interfaces of the fiber can hardly be wetted by the molten metal. Thus, if the metal matrix reacts with the reinforcing fiber across the interface in the course of manufacture, the strength of the product FRM is adversely affected. On the other hand, if the wettability of the reinforcing fiber by the matrix metal is poor, there is obtained no sufficient bond between the two components so that the resulting FRM cannot enjoy the benefit of combination in strength and elasticity, thus failing to exhibit satisfactory physical characteristics.

For this reason, it has been proposed and practiced, in the manufacture of FRM, to plate the surface of the reinforcing fiber with nickel or other metal or treat the surface with an inorganic compound, such as SiC, by the plasma coating technique, before impregnation of matrix metal. However, such processes are costly and involve complicated procedures.

In view of the above-mentioned disadvantages, the inventors of the present invention explored the possibility of using oxynitride glass fiber, which is a high-elasticity fiber, as the reinforcing fiber for FRM and found that an oxynitride glass containing at least a certain proportion of nitrogen is not reactive with molten metal even in the absence of plating or other pretreatment and is highly wettable so that substantially the additive effect of the two components can be realized in the resulting FRM.

SUMMARY OF THE INVENTION

The present invention provides a fiber-reinforced metal characterized in that it comprises a glass fiber containing at least 8 atomic percent of nitrogen and a matrix metal impregnated with said glass fiber.

In accordance with the present invention, a glass fiber, particularly an oxynitride glass fiber, with a nitrogen content of not less than 8 atomic percent is used as the reinforcing fiber. If the nitrogen content is not less than 12 atomic %, the glass fiber is sufficiently wetted by molten metal in particular so that the strength of the resulting FRM is as high as desired. A raw material, $Si_3N_4$ is relatively expensive, and a high nitrogen content of the glass gives less spinnability, so that the glass containing a nitrogen of not less than 8 atomic % is preferably used.

DETAILED DESCRIPTION OF THE INVENTION

Figure 1:
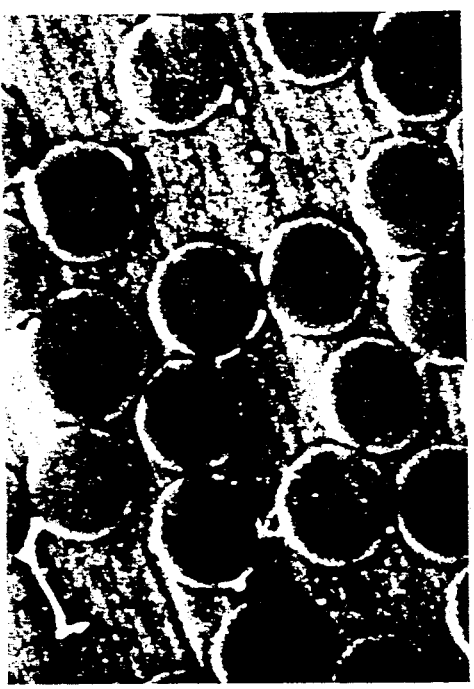
FIGS. 1, 2 and 3 are microphotographs ($\times 1000$) showing the sectional textures of FRM.

The glass fiber employed in the FRM of the present invention is preferably an oxynitride glass fiber containing an Si-$M_1$-$M_2$-O-N system which satisfies the following expressions in mole %:

$$65 \leq (SiO_2 + 3Si_3N_4 + M_1O) \times 100/(100 + 2Si_3N_4) < 100 \quad \text{(a)}$$

$$0.7 \leq (SiO_2 3Si_3N_4)/M_1O \leq 2.3 \quad \text{(b)}$$

[wherein $M_1$ means Ca or Ca+Mg and $M_2$ means one or more metals selected from the group consisting of Al, Sr, La, Ba, Y, Ti, Zr, Ce, Na, K, Sb, B, Cr, Pb, V and Sn].

Therefore, the oxynitride glass used in the present invention has an Si-Ca-$M_2$-O-N or Si Ca-Mg-$M_2$-O-N system.

The metal $M_2$ may be a single metal species or a combination of two or more metals.

Furthermore, this glass preferably contains 0 to 40 mole % of $SiO_2$, 26 to 70 mole % of CaO, 0 to 20 mole % of MgO and not more than 22 atomic % of $M_2$.

Therefore, the preferred composition for the oxynitride glass to be used as the reinforcing fiber in the present invention satisfies the following expressions in mole %.

$$65 \leq (SiO_2 + 3Si_3N_4 + CaO + MgO) \times 100/(100 + 2Si_3N_4) < 100 \quad \text{(a)}'$$

$$0.7 \leq (SiO_2 + 3Si_3N_4)/(CaO + MgO) \leq 2.3 \quad \text{(b)}'$$

In the above expressions, CaO represents the mole % of CaO or a compound convertible to CaO and MgO represents the mole % of MgO or a compound convertible to MgO.

The diameter of such glass fiber may range from 3 to 50 μm. The fiber may be a continuous fiber or a short staple measuring 0.5 to 100 mm.

As the matrix metal, such metals as aluminum, titanium, magnesium, nickel and copper, and various alloys thereof can be employed. For impregnating the reinforcing fiber with the metal, various techniques can be employed. A preferred process comprises placing the oxynitride glass in a metal mold, pouring a molten matrix into the mold, applying a pressure and cooling the mixture to solidify. To give a specific example, one may place the reinforcing fiber in a metal mold preheated at 500°~600° C., then pour a molten aluminum alloy heated at about 800° C., apply a pressure of about 1 to a few hundred MPa, and cooling the mixtrue to solidify into an FRM. By this process, the manufacture of FRM in the atmospheric air is feasible up to a temperature as high as about 900° C.

For the manufacture of the FRM of the invention, various techniques such as techniques of powder metallurgy, composite wire process, plasma spraying, flame spraying, vapor deposition, die casting as the above-described casting process, whereby an FRM having an optional shape can be manufactured.

In the present invention, the reinforcing fiber does not react with the matrix metal and the fiber is uniformly wetted by the metal. Accordingly, high tensile strength and elasticity are realized in FRM without resort to any special pretreatment such as the surface treatment of reinforcing fiber.

The following examples are further illustrative of the invention. In the examples, % stands for mole.

EXAMPLE 1

(Production of reinforcing fiber)

The material powders [$SiO_2$: 8.6%, $Si_3N_4$: 19.4%, CaO: 59.8%, MgO: 6.9%, $Al_3O_3$: 5.2%; nitrogen content 23.4 atomic %, expression (a)=96.2, expression (b)=1.00] were mixed and put in a molybdenum crucible, which was then heated with a graphite heater. The resulting glass was withdrawn in filaments from the bottom of the crucible. For spinning, the glass melted at 1,780° C. for one hour was held at 1,570° C., and allowed to drop from the nozzle disposed at the bottom of the crucible and the resulting filaments were taken up on a winder at a takeup speed of about 1,000 m/minute. The filaments had a tensile modulus of 205 GPa, a tensile strength of 3.62 GPa a fiber diameter of 12 μm and a density of 2.89 g/cm$^3$.

(Manufacture of FRM)

A metal mold (5 mm×5 mm×20 mm) held at 550° C. was charged with 0.72 g of the above-mentioned filaments as pre-oriented, which was maintained at that temperature for 10 minutes. Then, aluminum alloy 6061 (an Al-Mg-Si model material; (wt %) Si:0.4~0.8, Fe:0.7, Cu:0.15~0.40, Mn:0.15, Mg:0.8~1.2, Cr:0.04~0.35, Zn:0.25, Ti:0.15, Al:resd.) melted at 800° C., was poured into the mold and pressurized at 23 MPa. The contents were cooled under the same pressure to solidify. FIG. 1 is a microphotograph showing the sectional texture of the resulting FRM, which indicates clear interfaces between fiber and metal without signs of reaction as well as good wettability as evidenced by a uniform penetration of the metal between the interfiber spaces. Furthermore, the results of EPMA determination showed no migration of elements, with the fiber not having undergone reaction with the matrix but remaining intact.

The FRM thus obtained contained 50 volume percent of oxynitride glass fiber and had a bending modulus of 137 GPa and a flexural strength of 1.76 GPa. The matrix aluminum alloy 6061 itself has a tensile modulus of 68.6 GPa (bending modulus: GPa) and a tensile strength of 309 MPa (flexural strength 340 MPa).

EXAMPLE 2

Using a charge of 30.5% of $SiO_2$, 9.5% of $Si_3N_4$, 49.4% of CaO, 6.0% of MgO and 4.6% of $Al_2O_3$ (nitrogen content 1.06 atomic %, expression (a)=96.1, expression (b)=1.06), a glass fiber was produced in the same manner as Example 1. However, the melting temperature was 1,700° C. and the spinning temperature was 1,510° C. The resulting glass fiber had a tensile modulus of 113 GPa, a tensile strength of 3.43 GPa, a fiber diameter of 12 μm and a density of 2.85 g/cm$^3$.

Figure 2:
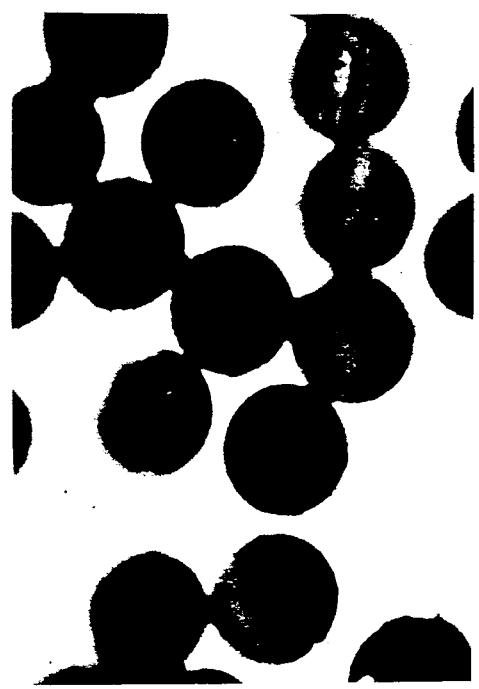

Using 0.71 g of the above fiber, an FRM was manufactured in otherwise the same manner as Example 1. FIG. 2 is a microphotograph showing the sectional texture of the resulting FRM. As in FIG. 1, no reaction zone was found at the fiber-Al alloy interface, with good wettability as evidenced by a uniform penetration of the metal into the interfilament spaces. The reinforcing fiber content of the product FRM was 60 volume %. This FRM had a bending modulus of 88.2 GPa and a flexural strength of 1.67 Gpa, thus attesting to an additive effect

COMPARATIVE EXAMPLE 1

Using a charge of 39.3% of $SiO_2$, 4.0% of $Si_3N_4$, 46.0% of CaO 5.0% of MgO and 5.0% of $Al_2O_3$ (nitrogen content 5.6 atomic %, expression (a)=95.4, expression (b)=0.99), a glass fiber was produced in the same manner as Example 1. However the melting temperature was 1,600° C. and the spinning temperature was 1,430° C. This glass fiber had a tensile modulus of 100 GPa, a tensile strength of 3.43 GPa a fiber diameter of 12 μm and a density of 2.82 g/cm$^3$.

Using 0.70 g of the above fiber, an FRM was manufactured in the same manner as Example 1. The reinforcing fiber content of this FRM was 50 volume %. This FRM had a bending modulus of 66.6 GPa and a flexural strength of 392 MPa. Thus, substantially no reinforcing effect on aluminum alloy was obtained.

EXAMPLE 3

(Production of reinforcing fiber)

The material powders [$SiO_2$, 35.29%, $Si_3N_4$: 10.38%, CaO: 36.23%, MgO: 6.04%, $Al_3O_3$: 12.08%; nitrogen content 8.1 atomic %, expression (a)=90, expression (b)=0.83] were mixed and put in a molybdenum crucible, which was then heated with a graphite heater. The resulting glass was withdrawn in filaments from the bottom of the crucible. For spinning, the glass melted at 1,670° C. for 2 hours was held at 1,500° C. and allowed to drop from the nozzle disposed at the bottom of the crucible and the resulting filaments were taken up on a winder at a takeup speed of about 1,000 m/minute. The filaments had a tensile modulus of 103 GPa, a tensile strength of 3.43 MPa, a fiber diameter of 12 μm.

(Manufacture of FRM)

Figure 3:
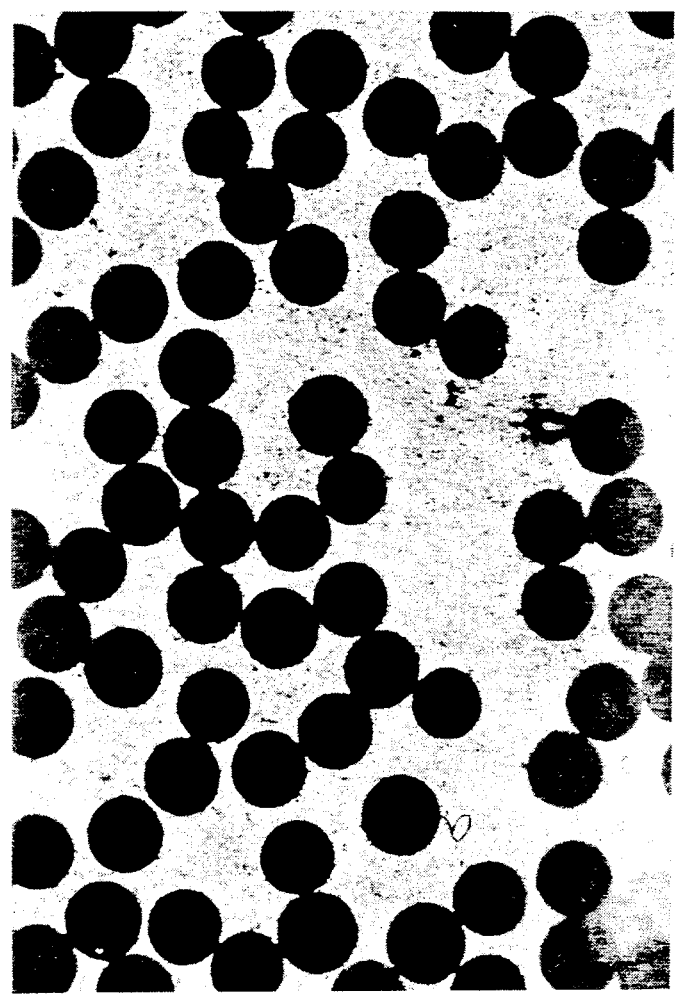

The above-mentioned filaments (ca 5 g) preoriented were wrapped in a frame (35 mm×20 mm×5 mm) of nickel mesh, and were charged together with the frame into a metal mold (5 mm×5 mm×20 mm) which was maintained at 500° C. for 10 minutes. Then, 1050 type aluminum alloy (Si: 0.25, Fe: 0.40, Cu: 0.05, Mn:0.05, Mg: 0.05, Zn: 0.05, V: 0.05, Al: rest wt %) melted at 800° C. was poured into the mold and pressurized at 6.86 MPa. The contents were cooled under the same pressure to solidify. FIG. 3 is a microphotograph showing the sectional texture of the resulting FRM, which indicates clear interfaces between fiber and metal without signs of reaction as well as good wettability as evidenced by a uniform penetration of the metal between the interfiber spaces.

The FRM thus obtained contained 30 volume percent of oxynitride glass fiber and had a bending modulus of 63.7 GPa and a flexural strength of 833 MPa. The matrix 1050 type aluminum alloy itself has a bending modulus of 49 GPa and a flexural strength of 49 MPa.

EXAMPLE 4

Using magnesium alloy (MC 5; Al:9.3~10.7 Zn:0.3>, Mn:0.1~0.5, Si:0.3>, Cu:0.1>, Ni:0.01>, Mg:resd.), an FRM was manufactured in otherwise the same manner as Example 1. However, the filaments and the metal mold were held at a temperature of 500 and the temperature of the melted magnesium alloy was 700° C. A chloride flux was used to suppress the reaction of magnesium with air. The resulting FRM has no reaction zone at the fiber-Mg alloy interface, with good wettability as evidenced by a uniform penetration of the metal into the interfilament spaces. The reinforcing fiber content of the product FRM was 50 volume %. This FRM had a bending modulus of 123 GPa and a flexural strength of 1.58 GPa, thus attesting to an additive effect. The matrix magnesium alloy itself has a bending modulus of 54.7 GPa and a flexual strength of 267 MPa.

We claim:

1. A fiber-reinforced metal comprising glass fibers and a matrix metal surrounding and wetting said glass fibers, said glass fibers having a nitrogen content of at least 8 atomic %.

2. A fiber-reinforced metal as claimed in claim 1, wherein the glass has a nitrogen content of at least 12 atomic %.

3. A fiber-reinforced metal as claimed in claim 1, wherein the glass is an oxynitride glass having a Si-$M_1$-$M_2$-O-N system and containing $SiO_2$, $Si_3N_4$ and $M_1O$ in amounts which, as mole %, satisfy the following equations (a) and (b):

$$65 \leq (SiO_2 + 3Si_3N_4 + M_1O) \times 100/(100 + 2Si_3N_4) < 100 \quad (a)$$

$$0.7 \leq (SiO_2 + 3Si_3N_4)/M_1O \leq 2.3 \quad (b)$$

wherein $M_1$ is Ca or Ca+Mg; and $M_2$ is a metal other than Ca and Mg.

4. A fiber-reinforced metal as claimed in claim 3, wherein $M_2$ is one or more metals selected from the group consisting of Al, Sr, La, Ba, Y, Ti, Zr, Ce, Na, K, Sb, B, Cr, Pb, V and Sn.

5. A fiber-reinforced metal as claimed in claim 1, the matrix metal is selected from the group consisting of aluminum, titanium, magnesium, nickel, copper, and alloys thereof.

* * * * *